June 25, 1940.  E. B. LEAR  2,205,569
FASTENER
Filed Dec. 2, 1939
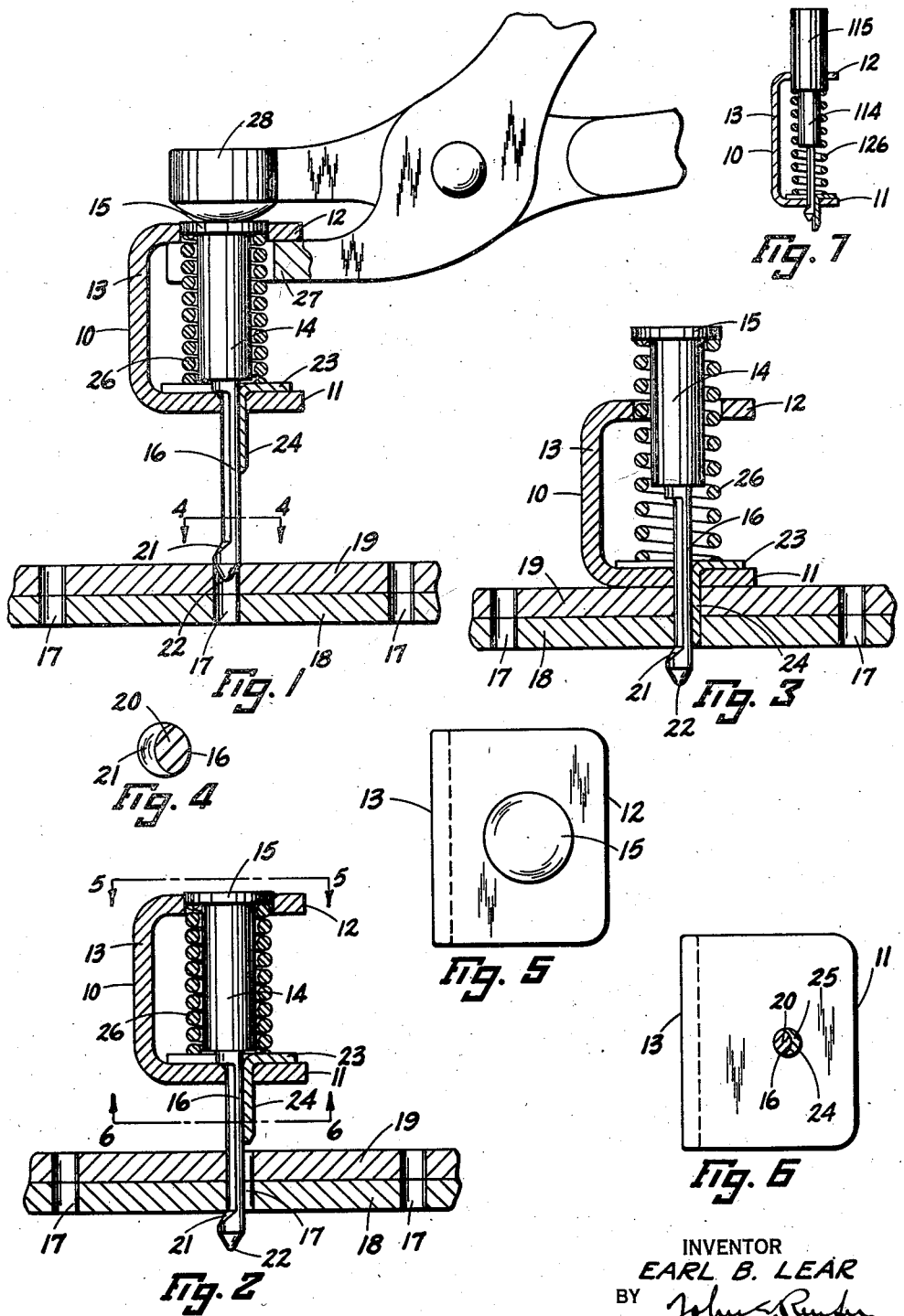
INVENTOR
EARL B. LEAR
BY
ATTORNEY Patented June 25, 1940

2,205,569

UNITED STATES PATENT OFFICE 2,205,569

FASTENER

Earl B. Lear, Garfield Heights, Ohio, assignor to The Cleveland Pneumatic Tool Company, Cleveland, Ohio, a corporation of Ohio Application December 2, 1939, Serial No. 307,313

6 Claims. (Cl. 85—5)

This invention relates to a fastener for temporarily holding together perforated plates or sheets in perforated alignment preparatory to the riveting thereof.

One object of this invention is to produce a fastener or temporary rivet which may be readily applied to and removed from the work, the temporary rivet being constructed in a manner forming a simple assembly which is strong, durable and efficient.

Another object of this invention is to produce a fastener capable of securing perforated metal sheets together in perfect perforate alignment.

Another object of this invention is to produce such fastener especially applicable for use in small perforations of about one-sixteenth of an inch, the fastener being constructed in a manner enabling replacement of the delicate parts thereof without difficulty.

Other objects and advantages more or less ancillary to the foregoing reside in the specific construction and aggroupment of the elements peculiar to this structure, as will become apparent from a more complete examination of this specification.

In the drawing:

Fig. 1 is a side elevational view partly in section of the improved fastener together with a portion of the tool with which the fastener is applied to or removed from the work. In this view, the fastener is shown in the position assumed during the first step of its application to the work.

Fig. 2 is a view similar to Fig. 1 illustrating the position assumed by the fastener during the second step of its application to the work.

Fig. 3 is a view similar to Fig. 1 showing the fastener in operative position.

Fig. 4 is an enlarged cross sectional view taken in a plane indicated by line 4—4 in Fig. 1.

Fig. 5 is a top plane view of the fastener looking in the direction of the arrows 5—5 in Fig. 2.

Fig. 6 is a cross sectional view taken in a plane indicated by line 6—6 in Fig. 2.

Fig. 7 is a side elevational view partly in section of a modification of the invention.

Referring to the drawing in which like symbols designate corresponding parts throughout the several views, 10 designates a channel shaped member including two substantially parallel side walls or plates 11 and 12 rigidly connected to each other by a cross wall 13 extending longitudinally therebetween. In practice, the member 10 is preferably made from a strip of flat steel bent to the desired shape, and of sufficient thickness to prevent flexing of the side walls 11 and 12.

Slidable through the two side walls 11 and 12, there is a rod 14 formed with an integral head 15 normally located above the upper plate 12. This rod is formed with a reduced portion 16 normally of circular cross section of a diameter equal to that of the perforation 17 formed through the work represented in the drawing by sheets 18 and 19. Intermediate its ends, the reduced portion 16 of the rod 14 is formed of oval shaped cross section 20 resulting in a lateral projection or step 21 formed on the rod 14 near the lower end thereof, which step is capable of engagement with the lower sheet 18 as will be explained later, it being pointed to facilitate its insertion into the perforations 17. On the lower plate 11 of the channel shaped member 10 rests a washer 23 provided with a finger 24 depending therefrom and extending through the lower plate 11 along the reduced portion 16 of the rod 14. This finger is of a crescent shaped cross section 25 forming with the oval shaped section 20 of the rod's portion 16 a perfect circle of a diameter equal to or slightly smaller than that of the perforations 17.

Resting on the washer 23, there is one end of a compression spring 26 having its other end engaging the underside of the rod's head 15, thereby acting between the channel shaped member 10 and the rod 14 for constantly urging the lateral projection 21 toward the lower plate 11 of the member 10. In practice, the plates 11 and 12 are spaced longitudinally an extent greater than that of the length of the finger 24, while the spring 26 may be compressed against the head 15 of the rod 14 to enable assembly of the device by inserting the finger 24 of the washer 23 through the plate 11 and seating the washer 23 on the plate, thereby also enabling removal or replacement of the washer 23 without difficulty.

In the modification shown in Fig. 7, the spring 126 instead of extending through the upper plate 12 of the channel shaped member 10, is limited between the head 115 of the rod 114 and the plate 11, which head 115 is made longer to extend below the upper plate 12, the construction being otherwise identical to that shown in Fig. 1.

The fastener is applied to or removed from the work by using a plierlike tool having a jaw 27 engageable with the underside of the upper plate 12 and a jaw 28 engageable with the head 15 of the rod 14. Upon movement of the two jaws toward each other, the rod 14 will be forced downwardly relative to the member 10 against the compression spring 26, thereby causing the lateral projection 21 to move axially relative to the finger 24 of the washer 23, or in other words, causing the rod 14 to assume the position shown in Fig. 1 relative to the member 10. In this position, the projection 21 may be inserted through the perforations 17 of the sheets 18 and 19 and subsequently moved laterally to assume the position shown in Fig. 2, thereby enabling insertion of the finger 24 into the perforations 17. Upon removal of the pressure exerted on the under side of the plate 12 and on the head 15 of the rod 14, the compression spring 26 active between the member 10 and the rod 14 will cause upward movement of the rod relative to the member 10 and the consequential engagement of the projection 21 with the underside of the lower sheet 18, while the side wall or plate 11 of the member 10 rests on the upper sheet 19, thereby resulting in the clamping of the work or sheets 18 and 19 between the side wall 11 of the member 10 and the projection 21 of the rod 14. In this instance, since the combined cross section of the reduced portion 16 of the rod 14 and of the finger 24 defines a circle of a diameter substantial to that of the perforations 17, the sheets 18 and 19 while being clamped together will also be maintained in perfect perforate alignment. Removal of the device from the work is effected by again applying pressure on the underside of the plate 12 and on the head 15 of the rod 14 by compressing the spring 26 as shown in Fig. 2, thereafter enabling slight lateral motion of the rod relative to the work and removal of the projection 21 from the work.

With reference to Fig. 7, it is obvious that the modified construction shown therein can be applied to or removed from the work in the same manner as above described in connection with the construction shown in Fig. 1.

From the foregoing explanation, it will be understood that the making of the channel shaped member 10 is relatively an inexpensive operation resulting in a construction wherein the rod carrying member is open on three sides to enable replacement of the washer 23 upon compression of the spring 26 against the head 15 of the rod 14, a feature which has been found advantageous especially in fasteners wherein the cross section of the reduced portion 16 of the rod 14 and the cross section of the finger 24 are necessarily very small and delicate.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A fastener for temporarily holding together at least two perforated sheets, including a channel shaped member having one of its side walls adapted to rest on the upper sheet, a rod slidable through said side wall, a lateral projection on said rod, said projection being insertable through aligned perforations in said sheets for engagement with the underside of the lower sheet, and a spring active between said member and rod for clamping the sheets between said side wall and projection.

2. A fastener for temporarily holding together at least two perforated sheets, including a channel shaped member having one of its side walls adapted to rest on the upper sheet, a rod slidable through the side walls of said member, a lateral projection on said rod near one end thereof, the end portion of said rod carrying said projection being insertable through aligned perforations in said sheets for engagement of said projection with the underside of the lower sheet, and a spring active between said member and rod for clamping the sheets between said member and projection.

3. A fastener for temporarily holding together at least two perforated sheets, including a channel shaped member having one of its side walls adapted to rest on the upper sheet, a rod slidable through said side wall, a lateral projection on said rod below said side wall, a finger depending from said side wall extending along said rod toward said projection, said projection and finger being insertable through aligned perforations in said sheets for engagement of said projection with the underside of the lower sheet and for maintaining said perforations in alignment, and a spring active between said member and rod for clamping the sheets between said side wall and projection.

4. A fastener for temporarily holding together at least two perforated sheets, including a channel shaped member having one of its side walls adapted to rest on the upper sheet, a rod slidable through said side wall, an integral head on one end portion of said rod, a lateral projection on the other end portion of said rod, a washer on said side wall formed with a finger extending therethrough along said rod toward said projection, said last end portion of said rod and said finger being insertable through aligned perforations in said sheets for engagement of said projection with the underside of the lower sheet and for maintaining said perforations in alignment, and a spring active between the head of said rod and said washer for clamping the sheets between said member and projection, said spring being capable of deflection to enable replacement of said washer via the opening between the side walls of said member.

5. A fastener including a rod having a lateral projection on one end portion thereof, a lower plate transversally of said rod slidable relative thereto substantially up to said projection, a spring active between said rod and plate for constantly urging said plate toward said projection, an upper plate transversally of said rod, a rigid connection between said plates extending longitudinally on one side of said rod, said upper plate and the other end portion of said rod being adapted to receive the jaws of a plierlike tool for compressing said spring and effecting longitudinal movement of said lower plate away from said projection.

6. A fastener including a rod having a lateral projection on one end portion thereof, a lower plate transversally of said rod slidable relative thereto substantially up to said projection, a washer on said plate having a finger extending through said plate along said rod, a spring active between said rod and washer for constantly urging said plate toward said projection, an upper plate transversally of said rod longitudinally spaced from said lower plate an extent greater than the length of said finger, and a rigid connection between said plates extending longitudinally on one side of said rod, said spring being capable of sufficient compression to enable replacement of said washer via the opening between said plate.

EARL B. LEAR.